U S009210050B2

(12) United States Patent
Bugenhagen et al.

(10) Patent No.: US 9,210,050 B2
(45) Date of Patent: Dec. 8, 2015

(54) SYSTEM AND METHOD FOR A TESTING VECTOR AND ASSOCIATED PERFORMANCE MAP

(75) Inventors: Michael K. Bugenhagen, Olathe, KS (US); Robert J. Morrill, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 367 days.

(21) Appl. No.: 12/651,528

(22) Filed: Jan. 4, 2010

(65) Prior Publication Data

US 2011/0010585 A1  Jan. 13, 2011

Related U.S. Application Data

(60) Provisional application No. 61/224,280, filed on Jul. 9, 2009.

(51) Int. Cl.
*G06F 15/173* (2006.01)
*H04L 12/24* (2006.01)
*H04L 12/26* (2006.01)

(52) U.S. Cl.
CPC ........ *H04L 41/5022* (2013.01); *H04L 12/2697* (2013.01); *H04L 43/50* (2013.01)

(58) Field of Classification Search
CPC ............ H04L 12/2634; H04L 12/2678; H04L 12/2618; H04L 43/50; H04L 41/5022
USPC ..................................... 714/32; 709/223, 224
See application file for complete search history.

(56) References Cited

U.S. PATENT DOCUMENTS

| 4,417,337 | A  | * | 11/1983 | Favin et al. ................... 714/714 |
| 5,440,719 | A  | * | 8/1995  | Hanes et al. .................... 703/21  |
| 5,598,532 | A  | * | 1/1997  | Liron ................................ 703/2 |
| 5,822,520 | A  | * | 10/1998 | Parker .......................... 709/230  |
| 5,845,270 | A  | * | 12/1998 | Schatz et al. .................... 706/11  |
| 6,088,804 | A  | * | 7/2000  | Hill et al. ........................ 726/25 |
| 6,285,660 | B1 | * | 9/2001  | Ronen .......................... 370/259   |
| 6,321,264 | B1 | * | 11/2001 | Fletcher et al. ............... 709/224   |
| 6,363,056 | B1 | * | 3/2002  | Beigi et al. .................... 370/252   |
| 6,549,882 | B1 | * | 4/2003  | Chen et al. ...................... 703/21  |
| 6,597,660 | B1 | * | 7/2003  | Rueda et al. ............... 370/230.1    |
| 6,636,484 | B1 | * | 10/2003 | Agrawal et al. .............. 370/248     |
| 6,650,731 | B1 | * | 11/2003 | Steltner et al. ............. 379/15.01   |
| 6,845,352 | B1 | * | 1/2005  | Wang ............................. 703/24  |
| 6,850,491 | B1 | * | 2/2005  | Firoiu et al. .................. 370/235   |
| 6,853,619 | B1 | * | 2/2005  | Grenot ......................... 370/232   |
| 6,922,663 | B1 | * | 7/2005  | Maurer .......................... 703/13   |
| 7,013,255 | B1 | * | 3/2006  | Smith, II ........................ 703/21  |
| 7,127,508 | B2 | * | 10/2006 | Edmison et al. ............. 709/224      |
| 7,167,820 | B2 | * | 1/2007  | Sarfati et al. .................. 703/13   |
| 7,184,408 | B2 | * | 2/2007  | Denton et al. ................ 370/244    |

(Continued)

OTHER PUBLICATIONS

S. Waldbusser; Remote Network Monitoring Management Information Base; May 200; Lucent Technologies; RFC 2919; Section 2. Overview, p. 3.*

*Primary Examiner* — Madhu Woolcock
(74) *Attorney, Agent, or Firm* — Swanson & Bratschun, L.L.C.

(57) ABSTRACT

A system and method for testing line state. Traffic through a communications path is determined. A test vector is generated. Attributes of the test vector simulate the traffic. The test vector is communicated to one or more end devices. Performance information for each of the attributes of the test vector is measured. A performance map utilizing the attributes and the performance information is generated.

20 Claims, 5 Drawing Sheets

(56) References Cited

U.S. PATENT DOCUMENTS

| | | | |
|---|---|---|---|
| 7,245,584 B2* | 7/2007 | Goringe et al. | 370/232 |
| 7,260,645 B2* | 8/2007 | Bays | 709/238 |
| 7,362,707 B2* | 4/2008 | MeLampy et al. | 370/235 |
| 7,408,883 B2* | 8/2008 | Deragon et al. | 370/249 |
| 7,418,492 B1* | 8/2008 | Cohen et al. | 709/224 |
| 7,447,622 B2* | 11/2008 | Arama et al. | 703/23 |
| 7,599,308 B2* | 10/2009 | Laver et al. | 370/252 |
| 7,599,755 B2* | 10/2009 | Adra | 700/108 |
| 7,636,317 B2* | 12/2009 | Stott et al. | 370/241 |
| 7,668,107 B2* | 2/2010 | Arad et al. | 370/242 |
| 7,688,723 B1* | 3/2010 | Lo et al. | 370/230 |
| 7,729,268 B2* | 6/2010 | Matta et al. | 370/252 |
| 7,733,794 B2* | 6/2010 | Damm | 370/252 |
| 7,774,440 B1* | 8/2010 | Bagrodia et al. | 709/221 |
| 7,778,196 B2* | 8/2010 | Moore | 370/252 |
| 7,826,381 B1* | 11/2010 | Kastuar et al. | 370/242 |
| 7,958,387 B2* | 6/2011 | Silverman et al. | 714/4.1 |
| 8,018,860 B1* | 9/2011 | Cook | 370/244 |
| 8,055,700 B2* | 11/2011 | Rhoda et al. | 709/202 |
| 2002/0165956 A1* | 11/2002 | Phaal | 709/224 |
| 2003/0023710 A1* | 1/2003 | Corlett et al. | 709/223 |
| 2004/0054505 A1* | 3/2004 | Lee | 702/186 |
| 2004/0059947 A1* | 3/2004 | Lee | 713/201 |
| 2004/0068681 A1* | 4/2004 | Smith | 714/43 |
| 2004/0117474 A1* | 6/2004 | Ginkel et al. | 709/224 |
| 2004/0122645 A1* | 6/2004 | Shevenell et al. | 703/21 |
| 2004/0190519 A1* | 9/2004 | Dugatkin | 370/394 |
| 2004/0236866 A1* | 11/2004 | Dugatkin et al. | 709/235 |
| 2004/0259555 A1* | 12/2004 | Rappaport et al. | 455/446 |
| 2005/0216234 A1* | 9/2005 | Glas et al. | 702/186 |
| 2006/0015512 A1* | 1/2006 | Alon et al. | 707/100 |
| 2006/0034185 A1* | 2/2006 | Patzschke et al. | 370/252 |
| 2006/0109791 A1* | 5/2006 | Shimizu | 370/241 |
| 2006/0109793 A1* | 5/2006 | Kim et al. | 370/250 |
| 2007/0030815 A1* | 2/2007 | Beerends et al. | 370/252 |
| 2007/0083630 A1* | 4/2007 | Roth et al. | 709/223 |
| 2007/0097868 A1* | 5/2007 | Bizzarri et al. | 370/241 |
| 2007/0208551 A1* | 9/2007 | Herro | 703/13 |
| 2007/0276907 A1* | 11/2007 | Maes | 709/204 |
| 2008/0117907 A1* | 5/2008 | Hein | 370/392 |
| 2009/0013070 A1* | 1/2009 | Srivastava et al. | 709/224 |
| 2009/0034428 A1* | 2/2009 | Jeong | 370/252 |
| 2009/0161569 A1* | 6/2009 | Corlett | 370/252 |
| 2009/0201824 A1* | 8/2009 | Leung et al. | 370/252 |
| 2009/0268713 A1* | 10/2009 | Ottur et al. | 370/352 |
| 2009/0279496 A1* | 11/2009 | Raissi-Dehkordi et al. | 370/329 |
| 2009/0320137 A1* | 12/2009 | White et al. | 726/25 |
| 2010/0082316 A1* | 4/2010 | Chawla et al. | 703/13 |
| 2012/0096156 A1* | 4/2012 | Kvernvik et al. | 709/224 |

\* cited by examiner

*FIG. 4*

| 1a | 1b | 1c | 1d |
|----|----|----|----|
| 2a | 2b | 2c | 2d |
| .  | .  | .  |    |
|    |    |    |    |
|    |    |    |    |
|    |    |    |    |
|    |    |    |    |
| .  | .  | .  | n  |

| 1  | 2  | 3  | 4  |
|----|----|----|----|
| 5  | 6  | 7  | 8  |
| 9  | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |

500

SYSTEM AND METHOD FOR A TESTING VECTOR AND ASSOCIATED PERFORMANCE MAP

CROSS-REFERENCE TO RELATED APPLICATION

This application claims priority to provisional application Ser. No. 61/224,280 entitled "SYSTEM AND METHOD FOR A TESTING VECTOR AND ASSOCIATED PERFORMANCE MAP," filed on Jul. 9, 2009 which is incorporated herein by reference.

BACKGROUND

The use of and development of communications has grown nearly exponentially in recent years. The growth is fueled by larger networks with more reliable protocols and better communications hardware available to service providers and consumers. In many cases, the applicable communications network may include any number of service providers, access providers, legs, devices, interfaces, and other elements that make performance testing extremely important as a diagnostic, troubleshooting and planning tool.

In some cases, users are able to "game the system" by giving testing packets or synthetic packets special priority or otherwise specially treating test packets. Additionally, standard static test patterns may be unable to accurately determine the performance of different amounts, types, and configurations of voice and data traffic through a test path. As a result, getting accurate and useful test results may be very difficult.

SUMMARY

One embodiment includes a system and method for coordinating point to point testing by utilizing test coordination language vectors that describe the characteristics of test windows or vectors, thereby allowing end-points to automatically coordinate test pattern changes.

One embodiment provides a system and method for testing line state. Traffic through a communications path may be determined. A test vector may be generated. Attributes of the test vector may simulate the traffic. The test vector may be communicated to one or more end devices. Performance information for each of the attributes of the test vector may be measured. A performance map utilizing the attributes and the performance information may be generated.

Another embodiment provides a test device for testing a communications path. The test device may include a monitor operable to determine traffic through a communications path. The test device may further include a test engine in communication with the monitor, the test engine may be operable to generate a test vector, wherein attributes of the test vector simulate the traffic, the test engine may be operable to communicate the test vector to one or more end devices, measure performance information for each of the attributes of the test vector, and generate a performance map utilizing the attributes and the performance information.

BRIEF DESCRIPTION OF THE DRAWINGS

Illustrative embodiments of the present invention are described in detail below with reference to the attached drawing figures, which are incorporated by reference herein and wherein:

FIG. 4 is a pictorial representation of a test vector 322 in accordance with an illustrative embodiment;

FIG. 5 is a pictorial representation of a performance map in accordance with an illustrative embodiment.

DETAILED DESCRIPTION OF THE DRAWINGS

Figure 1:
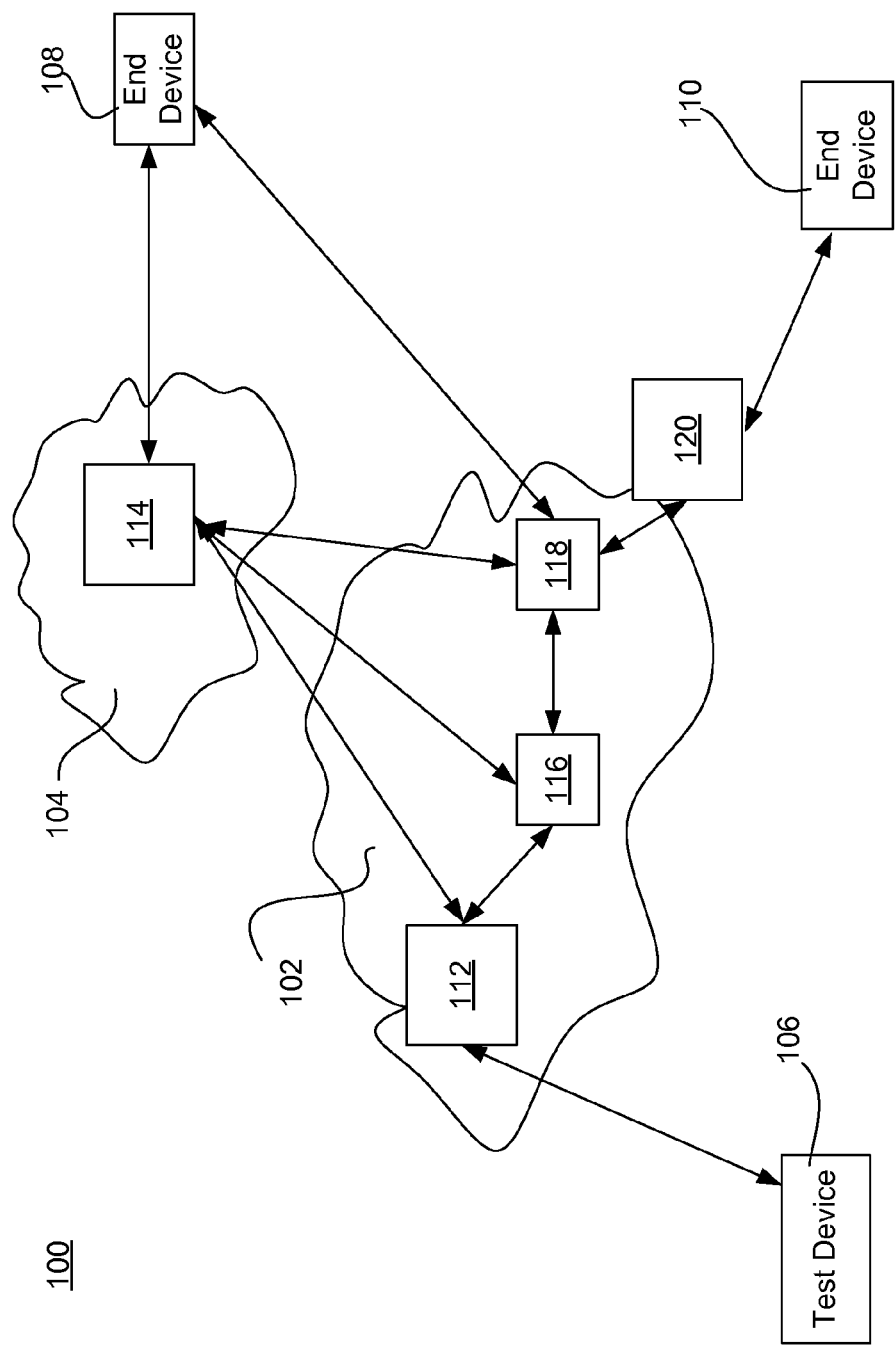
FIG. 1 is a pictorial representation of a communications environment in accordance with an illustrative embodiment.

The illustrative embodiments of the present invention provide a system and method for implementing state control for synthetic traffic testing via the use of testing vectors. In one embodiment, the performance tests executed and the results being recorded and presented are coordinated by the synthetic traffic probes also referred to as testing an end device. The synthetic traffic probes may utilize any number of vector based state control mechanisms. In one embodiment, each test device or end point has a set number of test and synthetic traffic flow attributes that are described via a vector of qualifying attributes. Each test vector may create a specific set of traffic conditions, and the resulting performance measurement. The combination of a set of test vectors provides a multi-dimensional packet performance map of the network between the associated end points. Both the vector windows (test scenarios), and the number of vectors are repeatable, and dynamically controllable by the end point as to accurately characterize the network performance of the types of traffic of interest.

The test vector and corresponding attributes are exchanged between the end points to coordinate the test itself and to identify the synthetic flow characteristics that are identifiable when implementing the test through a communications test path or between points in a network. As a result, a small amount of information is exchanged between the end point probes to setup and conduct tests with flexible test attributes, such as time, duration, Quality of Service (QoS) and/or Class of Service (CoS) level being tested, rate, burst attributes, UNI or multicast packet attributes, addressing, packet type, protocols or other packet flow attributes being tested in that test window are described in the test vector protocol under test. A multi-vector array of tests may be set and implemented with each array having different test attributes in such a manner that the test end points may coordinate which test is being executed and for what duration the test is to occur. As a result, the end points may run multiple test scenarios while keeping test state and output performance synchronization between the end points. The multiple test vectors make predicting test traffic less difficult and provide more accurate performance information regarding all of the traffic being communicated through the communications path. The exchange of test vectors, or text vector language (protocols) may be performed from a peer to peer, or master to peer relationship.

Control of the test vectors being used is available to external programs or a test server function or element of the testing probe itself. In one embodiment, a hierarchical mechanism may be employed to provide secure prioritized access to the test vector control. The test control or logic may modify the number of test vectors being run and/or add new test vectors to mirror the type of service being run. As a result, the synthetic test traffic may dynamically match the live traffic characteristics to provide matching performance results with the live traffic flows. Live matching may be conducted by the testing probe measuring packet performance measures, such as remote network monitoring (RMON) for frame size matching or more complex probes that match specific requested protocols and/or other flow attributes. Each test probe location may have a state control machine that is used to communicate the test vector language, and accept or deny test scenarios based on settable attributes, and/or network states that are derived from the network state itself. One embodiment of the vector language state machine may deny testing requests when the network is in emergency status. Such a denial may be communicated back to the end point or probe requesting the test via the test vector language or protocol. It may also be assumed that the common state control machine logic is present in the test point probes that enable the testing process which tracks the beginning, under test, and testing summations states, along with the typical input outputs Management Information Base (MIB) system values and test outputs.

The end point may also report results in a multi-dimensional array performance map based on the test vectors that are present. An exemplary resulting performance map for a class of service or a combination of protocol, address, port, QoS/COS markings, inter-frame gap, bits per second, and frame label types may be reported for each QoS performance within that Class of Service level. The results of the reporting would be an indicative QoS performance map of the end-to-end path for the specific test vectors commonly known as test scenarios or attributes that are gathered into a testing window time period.

In one embodiment, the test vectors being generated are controlled by a "reflector/predictor function" that statistically reads the live packet flows crossing the network to (1) modify the test vectors to resemble the live packet flows (reflector function), or (2) send a specific type of packet flow that predicts performance prior to the flow actually being originated (predictor function). The reflector function may be a test vector control input that is feed by live traffic statistical values. The predictive function may include a set of preset vectors that are triggered automatically by applications, and/or other lower level programs/state machines.

The end-to-end packet path state represents the communications path, connections, and conditions between a test device and an end device. In some cases, the synthetic traffic probe or test device and the end device may be the same device. The communications path is one or more connections, links, services, or paths. The test vector(s) includes multiple, changeable attributes that define the performance characteristics and traffic type being utilized to test the path. The vector is composed of test attributes, such as test type, test period or length, test state, other coordinating testing control messages, and flow attribute variables, such as frame size, protocol types, burst size, QoS markings, inter-frame gap, bits per second, ports, and so forth that are associated with typical throughput and/or performance tests, such as the Internet Engineering Task Force (IETF) Request For Comment (RFC) 2544 or other performance tests. The test vector represents synthetic traffic that may be used to gauge the performance of an end-to-end path by transmitting specialized test vector packets and tracking the performance of these specialized packets over the communications path. Test vectors may also be generated by statistical observation of live traffic via gathering the performance MIB from network element ports, such as Ethernet ports, or from probe hardware and software that can gather and summarize live traffic statistics.

The test vector may include different array elements with differing quality of service (QoS) marking levels to aid in class of service verification. The results for each attribute, component, element and/or array of the test vector may be compiled into a performance map that may be utilized for comprehensive trouble shooting, network diagnostics, service analysis and/or other purposes. The test vector may be utilized for standard line state testing as well as enhanced line state measurements for QoS and/or CoS determinations and analysis. The test vector language may also contain TLV (Time, Length, and Value) fields to convey messages between the test points. TLV fields are used to provide flexibility in state exchange information between the end points. One TLV embodiment may include acknowledgement or denial for testing requests, subsequent embodiments may provide a plethora of "probe" state or vector language exchange information on test authentication mechanisms, additional traffic or test information, network state, multipoint (more than two test points either linearly or multipoint testing), and so forth.

FIG. 1 is a pictorial representation of a communications environment in accordance with an illustrative embodiment. The communication environment 100 of FIG. 1 includes various elements that may be used for wireless and wired communication. The communications environment 100 may include networks 102 and 104, test device 106, end devices 108 and 110, intermediary devices 112, 114, 116, 118, and 120.

The communications environment 100 may include any number of networks, elements, devices, components, systems, and equipment in addition to other computing and communications devices not specifically described herein for purposes of simplicity. For example, the communications environment 100 may also include various customer premise equipment (CPE), user network interfaces (UNIs), maintenance entities (MEs), systems, equipment, devices, rate limiters, test engines, and/or bit shapers. The different elements and components of the communications environment 100 may communicate using wireless communications, such as satellite connections, WiFi, WiMAX, CDMA, GSM, PCS, and/or hardwired connections, such as fiber optics, T1, cable, DSL, Ethernet, high speed trunks, and telephone lines.

Communications within the communications environment 100 may occur on any number of networks. In one embodiment, the networks 102 and 104 may include wireless networks, data or packet networks, cable networks, satellite networks, private networks, publicly switched telephone networks (PSTN), communications network, or other types of communication networks. The communications networks 102 and 104 are infrastructure for sending and receiving messages, data, packets, and signals according to one or more designated formats, standards, and protocols. The networks 102 and 104 of the communications environment 100 may represent a single communication service provider or multiple communications services providers. The features, services, and processes of the illustrative embodiments may be implemented by one or more testing or communications devices of the communications environment 100 independently or as a networked implementation.

The test device 106 is a device operable to generate, transmit, receive, measure, and analyze the test vector. The test device 106 and the end devices 108 and 110 are examples of synthetic test probes. The test device 106 and the end devices 108 and 110 may represent servers, NNI's (network to network interfaces, UNI's (User to Network Interfaces), media gateways, pinhole firewalls, switches, probes, testing equipment, or other communications devices whether constructed via hardware, software or combination therein. Any other communication enabled devices capable of implementing the described processes and functionality, such as handsets, set top boxes, access points, game stations or other may be considered end devices. The test vector generated by the test device 106 may be utilized for one-way or two-way tests. For example, the test vector may be sent one way to the end device 108 that may determine and analyze the test results and corresponding performance map. In another example, the test vector may be sent to the end device 110 with the test vector being looped back by the end device 110 for receipt and analysis by the test device 106. The test vector may be generated by the test device 106 and sent to any of the elements, components, modules, systems, equipment or devices of the communications environment. These transmissions may occur in an unstructured manner or structured manner to assist in degradation isolation. In one embodiment, vector testing may be performed sequentially to each element along the communication path and may be distributed to multiple test points either in a linear or multipoint fashion. Other embodiments may be constructed using alternative element connectivity patterns.

The test device 106 is operable to generate the test vector synchronizing the communication of the vectors between the test device 106 and one or more end devices 108 and 110. The test vector may be sent to individual devices or to multiple devices in order or simultaneously for effective testing and analysis. The synchronization of the test vector 322 may allow state control, test initiator authentication, test approval, and test stop functions. Received vector performance results may be utilized to manipulate state control mechanisms contained with various state machines associated with specific protocols or applications. State machine mechanisms may be modified to reflect enhanced performance information, such as circuit degradation allowing for enhanced state machine control, such as graceful discard.

The test vector may be dynamically configured by the test device 106. In one embodiment, the test vector may be dynamically altered between test cycles to test varying conditions and factors. The test vector 106 may include destination information for any of the devices of the communications environment 100. Destination designation may occur by utilizing any common protocol address and/or protocol information generally available in the network. This could include any type unicast and/or multicast traffic.

In one embodiment, the intermediary devices 112, 114, 116, 118, and 120 may be configured to perform a loop back to the test device 106 or to other synthetic test probes generating or communicating the testing vector. The loop back command may be a separate communication or included in the test vector itself. A loop back test for the intermediary devices 112, 114, 116, 118, and 120 may be particularly useful if portions of the overall communications path, such as communications between test device 106 and end device 110 through communications network 102 and intermediary devices 112, 116, 118, and 120 are failing or experiencing noise or errors that may affect the overall test. Device loopback may include specific loopback commands for one or more interfaces on any device contained anywhere with the network 100 allowing for testing performance through the device.

In one embodiment, test vectors may be implemented first for the intermediary device 112 followed second by tests for the intermediary device 116 and so forth until sufficient performance information and maps provide a better picture and analysis of problems within the segmented or overall communications path. For example, a portion of a communications path or flow utilized to implement a virtual circuit may be analyzed sequentially to determine where the network failures are occurring. In one embodiment, commands to switch between multiple layers representing different flows or to test different nodes, segment paths, or sections of a communications path may be implemented based on OAM standards, such as IETF RFC 1736. This application incorporates by reference utility application Ser. No. 11/809,885, filed on May 31, 2007, entitled: System and Method for Routing Communications Between Packet Networks Based on Intercarrier Agreements.

Figure 2:
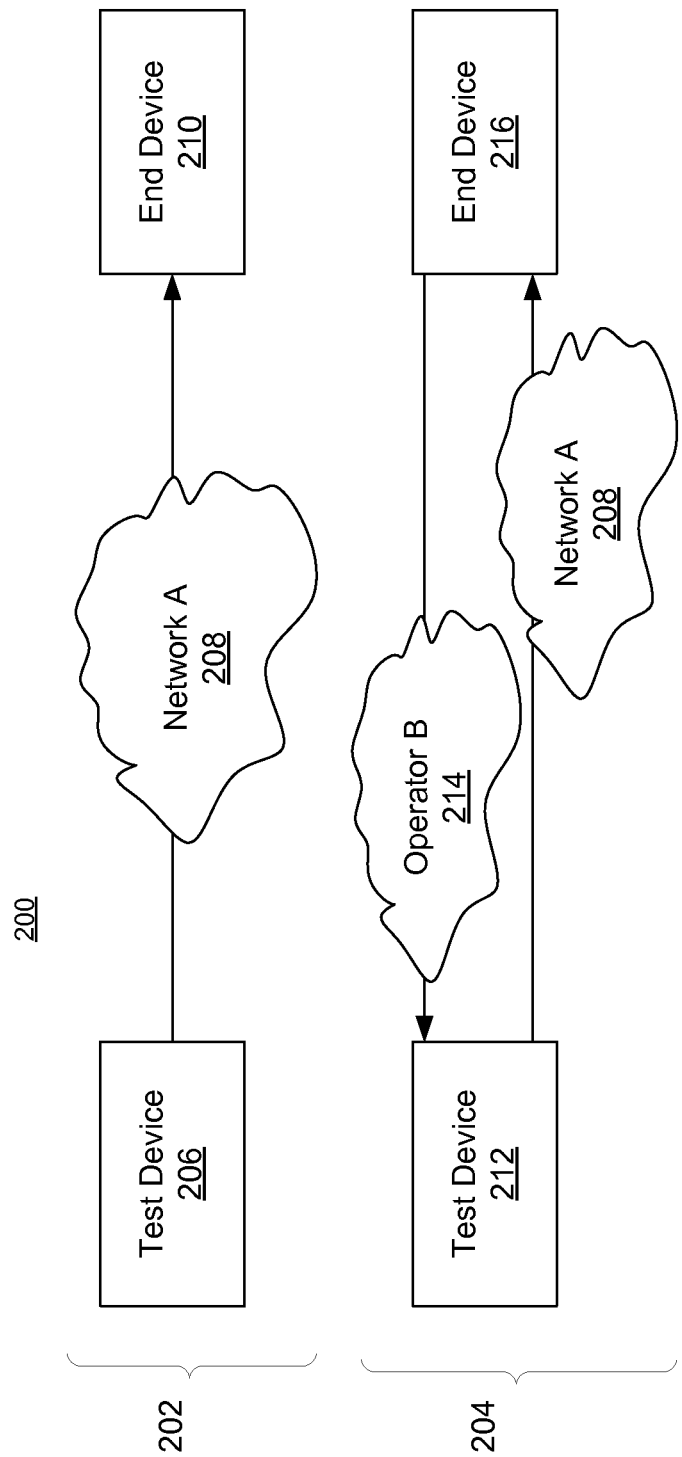
FIG. 2 is a pictorial representation of test paths in accordance with an illustrative embodiment.

FIG. 2 is a pictorial representation of communications paths in accordance with an illustrative embodiment. The communications paths 200 of FIG. 2. include test paths 202 and 204. The test path 202 further include test device 206, network A 208, and end device 210. Test path 204 further includes test device 212 network A 208, operator B 214, and end device 216. The test paths 202 and 204 are particular implementations of communications paths undergoing testing.

The test path 202 illustrates a one-way test between test device 206 and end device 210 through network A 208. As a result, the test vector may be generated by the test device 206 and then the performance information determined from the communication of the test vector from the test device 206 to the end device 210 may be analyzed to generate a performance map corresponding to the test vector. The performance map may be further distributed by the end device 210 to the test device 206, network operators, communications management systems, portals, and/or other users or devices for utilization or further analysis.

Test path 204 illustrates a two-way test between test device 212 and end device 216 through network A 208 and operator B 214. It should be understood that the actual communications path may differ between devices depending upon transmit/receive direction associated with each element. As previously described, the test vector may be communicated through any number of networks, countries, states, connections, devices, systems, or equipment. The end device 216 may include loop-back circuitry, switches, or other internal or external devices or electronic circuitry for returning the test vector as a single roundtrip path. Operator B 214 may represent a service provider or network operating independently from network A 208.

Figure 3:
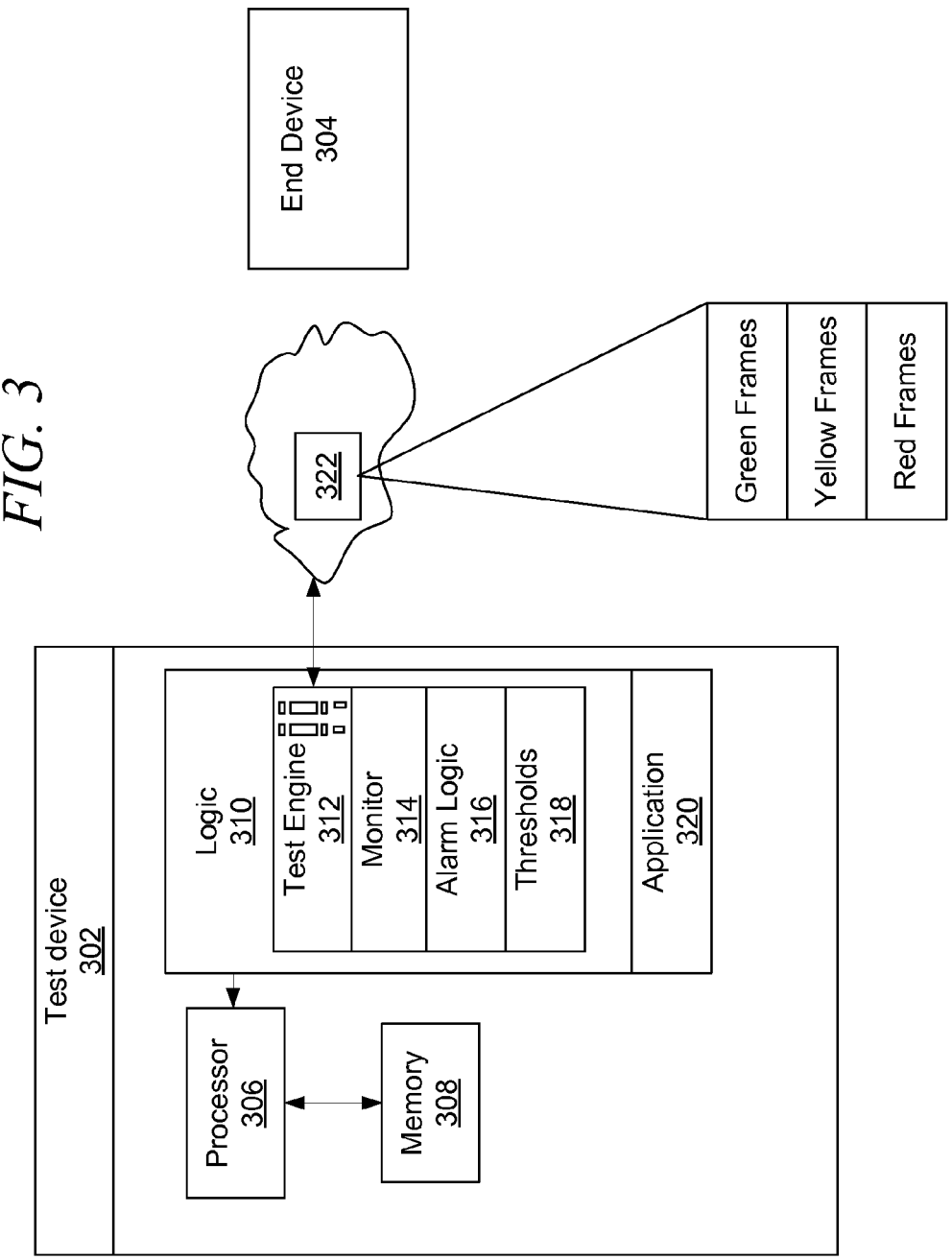
FIG. 3 is a block diagram of a test device in accordance with an illustrative embodiment.

FIG. 3 is a block diagram of a test device in accordance with an illustrative embodiment. The test device 302 may include a processor 306, a memory 308, logic 310, a test engine 312, a monitor 314, alarm logic 316, one or more thresholds 318, and an application 320. The test device 302 and the end device 304 may communicate test vector 322 that may include various attributes. In one embodiment, performance metrics, information, and thresholds may be utilized to mark each frame or attribute as green, yellow, or red. The test device 302 and the end device 304 include any number of computing and telecommunications components, devices or elements not explicitly described herein which may include busses, motherboards, circuits, ports, processor, memories, caches, interfaces, cards, converters, adapters, connections, transceivers, displays, antennas, and other similar components.

The test device 302 and end device 304 may be a particular implementation of devices, such as the test device 106 and end device 108 of FIG. 1. In one embodiment, the test device 302 may include a designated port for test, Ethernet, or synthetic communications to one or more end devices. The end device 304 may represent any number of client devices, networks, or communications systems, equipment, or devices. The illustrative embodiments may be implemented in hardware, software, firmware, or any combination thereof.

The processor 306 is circuitry or logic enabled to control execution of a set of instructions. The processor 306 may be one or more microprocessors, digital signal processors, central processing units, application specific integrated circuits, or other devices suitable for controlling an electronic device including one or more hardware and software elements, executing software, instructions, programs and applications, converting and processing signals and information, and performing other related tasks. The processor 306 may be a single chip or integrated with other electronic, computing or communications elements.

The memory 308 is one or more local or remote hardware elements, devices, or recording media configured to store data for subsequent retrieval or access at a later time. The memory 308 may be static or dynamic memory. The memory 308 may include a hard disk, random access memory, cache, removable media drive, mass storage, or configuration suitable as storage for data, instructions, and information. In one embodiment, the memory 308 and processor 306 may be integrated in their respective devices. The memory 308 may use any type of volatile or non-volatile storage techniques and mediums. In one embodiment, the memory 308 may store the test vector 322, performance information, and performance map for analysis and tracking as herein described. The memory 308 may include any number of databases for tracking transmitted and received test vector 322 and individual attributes from various test cycles.

In one embodiment, the test device 302 is a specialized computing and communications device. The test device 302 may include digital logic implemented by the processor 306 or instructions or modules that are stored in the memory 308 that implement the features and processes of the logic 310, the test engine 312, the monitor 314, the alarm logic 316, the thresholds 318, and the application 320. The application 320 represents one or more applications that may be implemented by the test device 302 or one or more other computing or communications devices communicating through the networks and providers associated with the test device 302.

The test engine 312 is a device or logic operable to generate the test vector 322 and individual attributes. The test engine 312 may utilize different QoS and test parameters, such as frames per second, frame size, and other similar elements. For example, frames are fixed lengths of data blocks. The size of the frames may vary and as a result the minimum and maximum bandwidth may vary based on real time frame size. In real time traffic any number of frame sizes may be utilized each of which includes different amounts of data increasing or decreasing the bandwidth associated with each type of frames, such as standard 1518 byte frames and jumbo frames that may carry up to 90000 bytes of payload. The test engine 312 may utilize different size frames in the test vector 322 to determine how similarly size packets are being processed and communicated within the communications path. For example it is commonly understood that network device performance may be a function of the packet size transversing the element due to the processing overheads associated with each packet. Test vectors that generally match the communication flow provide more useful information than those that do not. As another example, some application protocols, such as VoIP may be less impacted by packet loss (lossy) whereas file transfer performance may be severely impacted by packet loss (lossless). Understanding loss by frame size and correlating this to application type (lossy or lossless) is useful to understanding performance.

The logic 310 is one or more engines operable to manage cycles of testing including individual test vectors and attributes. The logic 310 may also govern compilation and/or analysis of performance information based on the test vector 322 and communication of the resulting performance map. In particular, the logic 310 may be configured to dynamically alter test vectors based on existing or predicted network conditions. The logic 310 may also minimize the attributes and length of the test vector 322 as needed. Dynamic modifications may be rooted in the ever-changing protocols in use, user applications, time of day, network load, performance time window, network disturbance, outage or any other factor causing a performance deviation from the current performance understanding.

The monitor 314 is a measurement device operable to determine performance information based on the characteristics, conditions, and measurements read for each attribute of the test vector 322. The monitor 314 or test engine 312 may also be utilized to measure and monitor real time traffic and traffic trends between the test device 302 and the end device 304. For example, the monitor 314 may determine characteristics of traffic through the communications path for the test engine 312 to generate attributes of the test vector 322. The monitor may further compile communications characteristics and statistics for data, packets, frames, and other synthetic communications coming into and leaving the test device 302. In one embodiment, the test engine 312 and the monitor 314 may be integrated for measuring traffic and the performance results that are determined based on communication of the test vector 322. Compilation may include any type of data manipulation to allow representation, such as normalization, mathematical transformation, statistical processing, or other. Data may aggregate such that performance information may be reported via tables, graphs, charts or other any other means required.

The alarm logic 314 is logic operable to transmit a signal that one or more portions of the communications path between the test device 302 and the end device is experiencing failure, discarded packets, or other impacting errors at a logical or physical level. The alarm logic 314 may also report non-compliance with a QoS, service level agreement, or other factor. User defined alarms specific to the desired test may be reported via extensible generic alarm mechanisms similar to proprietary SNMP extensions.

The thresholds 318 are performance levels, standards, and measurements. The thresholds 318 may be utilized with the performance information determined from the test vector logic operable to assign or reassign designations to the test vector 322 as received at the test device 302. In particular, the thresholds 318 may mark or re-mark attributes as green frames, yellow frames, or red frames for further analysis or visual presentation to one or more users in a performance map. The thresholds 318 may re-mark the attributes based on any thresholds, such as Committed Information Rate and Excess Information Rate.

The application 320 is one or more program applications that may be executed by the test device 302 or one or more network devices. For example, a streaming application on a wireless device may communicate with the application 320 to determine the top ten optimal communications paths between two points based on real time performance as measured by the test vector 322. For example, the test vector 322 may emulate the types of communication performed by the application 320 to determine the performance map and performance information before the application is even initiated. In one embodiment, the application 320 may coordinate efforts to return a performance map to one or more internal or externally operated applications before, during, or after execution to maximize performance by adjusting QoS, packet size, protocols and other factors that may impact performance. The application 320 may be used to enhance the network or other based upon the performance results.

FIG. 4 is a pictorial representation of a test vector in accordance with an illustrative embodiment. FIG. 4 illustrates one embodiment of a test vector 400. As shown, the test vector 400 may include any number of attributes, test frames, samples or arrays that make up the test vector 400. In one embodiment, the test vector 400 may specify a destination address (i.e., itself for a loop back test, or an IP address of end device). The test vector 400 may be issued once, of a short duration or may be continuous. Similarly, the time period or frames between running tests may vary significantly. For example, in response to determining a problem is IP based rather than Ethernet based, the test vector 400 may be dynamically adjusted to test a specific IP address for a specific VoIP protocol.

The test vector 400 may utilize different variables for the arrays including, but not limited to, frame size, QoS marking, protocol, inter-frame gap, bits per second, bursting, jitter, loss, and delay markings. A single vector may be repeated indefinitely with that vectors time window providing a performance summation period whereby the performance is captured and stored. When multiple vectors are used, the end points may incrementally change each test vector attributes either linearly or randomly over a range of or a specific set values. Those skilled in the art will recognize there are a limited set of protocols, validate frame sizes, bandwidth rates, and so forth that can be used for each attribute. The logic or probe state machine controls the "vector map" size via customer or default settings, and coordinates these tests with the other test points.

In one embodiment, the test vector 400 includes any number of rows and columns. For illustration purposes the test vector 400 is represented in a table format. For example, the test vector 400 as shown includes eight rows and four columns. Each row may be specific to one QoS level marking. Similarly, each column may correspond to a type of test. For example, QoS type 1 may include variations in packet size 1a, protocol type 1b, burst size (windows), and 1d other attributes (i.e., UDP port, duration)

In one embodiment, the test vector 400 may be utilized by a state machine or module, chipset, application specific integrated circuit (ASIC), field programmable gate array (FPGS), or other programmable logic within a testing device or probe to test various unicast or multicast communications paths. The test devices may be positioned to provide unique level 1, 2 or 3 test points. For example, the test devices may test a critical inter-state trunk that carries large portions of a service provider's network traffic at any given time. The test vector 400 may utilize segment, duration, and combined distributions. Similarly, the test vector 400 may utilize trend analysis and capacities when dynamically reconfiguring itself or a additional test vectors. For example, in response to test vectors determining a particular QoS attribute for streaming video always yielding the same results, the attribute may replace an attribute to examine QoS for Ethernet channels as these channels may have a tendency to experience more problems. For example, the first attribute may only be tested once an hour instead of each minute and during the remaining fifty nine minutes the Ethernet channel is tested.

The test vector 400 may also be disabled in response to determining the tests are adversely affecting the communications paths or in direct response to specific network outages. Strings of attributes within the test vector 400 may utilize different frame sizes. In some cases, the test vector 400 may attempt to duplicate the frame size distribution of existing traffic being propagated through the communications path.

In one embodiment, the test vector may be configured to distribute the size of frames utilizing the IETF Remote Network MONitoring protocol (RMON). Other embodiments may use any other standard or non-standard operational support protocols.

FIG. 5 is a pictorial representation of a performance map in accordance with an illustrative embodiment. FIG. 5 is an example of a performance map 500. The performance map 500 may correspond to results of a testing vector, such as test vector 400 of FIG. 4. The performance map 505 may include performance metrics for a set of tested attributes based on a given QoS level. The performance map is a multi-dimensional array of test results limited based on the attributes testing criteria, such as CoS.

FIG. 5 is a pictorial representation of a performance map in accordance with an illustrative embodiment. The performance map 500 may be dynamically updated as attributes of the test vector are received and analyzed based on the frequency at which the attributes are communicated from the test device. For example, a number of the attributes may be sent simultaneously and another portion may be sent sequentially with a 100 ms delay between each communication. The periodicity of test communications can be altered via operator test device configuration to accommodate network impact or other operator specific issues. Parameters such as delay, jitter, packet loss, utilization, and other quantities corresponding to the test vector are stored for each QoS level in the performance map 500. The performance map 500 may also store information, such as the sampling interval average, maximum, minimum, variance, and other factors. Information stored could consist of captured information and/or derived information.

Thresholds may also be used to record "events" that exceeded an applications ability to provide specific levels of user Quality of Experience and/or user graphical information about network performance. Given the vector map is multi-dimensional the threshold and logic may report performance of statistical packet loss for different protocols simultaneously. Once a threshold is reached, a multi-dimensional loss indicator may indicate that video frames are "lossy" but voice frames are operating as normal. The test point may be capable of detecting corresponding performance attributes and reporting the exact performance case. For instance, if all protocols marked with one QOS bit have packet loss, the test summation function may report that the QOS bit level is the problem rather than that all the protocols are experiencing loss. In a second example, an IP Address may be the common attribute between failed tests by which the logic or summation engine would identify a problem connecting to that IP address. Cross vector analysis may involve using a reporting function capable of performing mathematical matrix vector analysis methods.

This concept of multi-dimensional graphical representation may also be used to provide network state performance information to other applications, the control plane itself, or other external systems.

Any number of control inputs governing configuration of the performance map and subsequent test vectors may be utilized. In one embodiment, the performance map 500 may utilize error focusing. In response to the test device or probe noticing loss, jitter, delay or other performance issues beyond a specified threshold, the test device may dynamically alter subsequent test vectors to focus on the attributes with errors for fault identification purposes. For example, in response to detecting jitter for multiple QoS levels involving Voice over Internet Protocol (VoIP) communications, the test vector 322 may dynamically generate additional attributes that focus on the VoIP communications to further diagnose the problem. In another embodiment, the test device may choose to ignore faulty communications paths in favor of concentrating on the higher QoS levels. In another embodiment, threshold detection may trigger a new vector with a different test based up on a different QoS or CoS.

The performance map 500 may also utilize averaging window control. For example, user and applications may require control over the sampling update frequencies utilized within the test vectors utilized to generating the performance map 500. As a result, the test parameters are made available for control by the user application to ensure the desired outputs of the performance map 500 are obtainable; for example, sampling frequency, fault type or other required outputs.

The performance map 500 may be utilized as a state map for an end-to-end communications path. The determination of the state of the communications path may be particularly useful for load balancing, QoS certification, and QoS best fit scores. Due to the capability to address multiple performance issues concurrently, traditional state mechanisms may be extended or modified to reflect additional information as part of the state. For example, a traditional state may be 'connected' whereas a modified state may be 'connected but degrading'.

In one embodiment, the application layers and network protection layers may be able to concatenate, associate or correlate two or more sets of performance maps in order to load balance multi-path inter-system communications paths. Similarly, specific types of patterns within the test vectors may be used to test and certify service level agreement performance for a single test or ongoing tests that change dynamically to ensure no single type of traffic is being given preferential treatment just to pass a performance test. The performance map 500 may also be queried to enable applications to pick class of service (COS) marking to choose to get the best service in real-time. For example, the application may automatically review the performance map 500 before initiating a process or communication in order to select the COS with the best performance and/or alternatively utilize a different communication route with better performance. As a result, the application may communicate packets or other communications utilizing the optimal COS marking. Class of Service markings provide business oriented designations associated with the level of service for which the customer is paying. For example, a customer may be capable of getting a higher level of service than he is willing to pay, as such his information flows may be marked accordingly such that those with higher rankings get priority.

With regard to load balancing for connection admission control (CAC), Resource ReSerVation Protocol (RSVP) may become a state passed between ends via operation administration message (OAM) communications and/or intermixed with utilization information in the QoS line state map. For example, a method for gathering utilization may be used via counters instead of synthetic traffic.

The performance maps 500 may utilize hierarchal correlations or may be correlated at other levels to validate equal QoS treatments or "out of state" network treatment of two equal QoS levels on different virtual circuits. For example, layer 1 control for the performance map 400 may become a layer 1 control output to change or reallocate radio frequency (RF) windows or RF paths for cable modem termination systems (CMTS) and/or wireless systems.

In one embodiment, performance results of the test vector may be used to generate a graphical display performance map. For example, a spider web chart may be utilized with protocol sectors, bandwidth, and color, such as green, yellow, and red indicating a category for the various attributes. This type of chart may provide a simple visual display of key performance parameters. Other graphical display charts may provide optimal reporting results depending upon the test vector.

Figure 6:
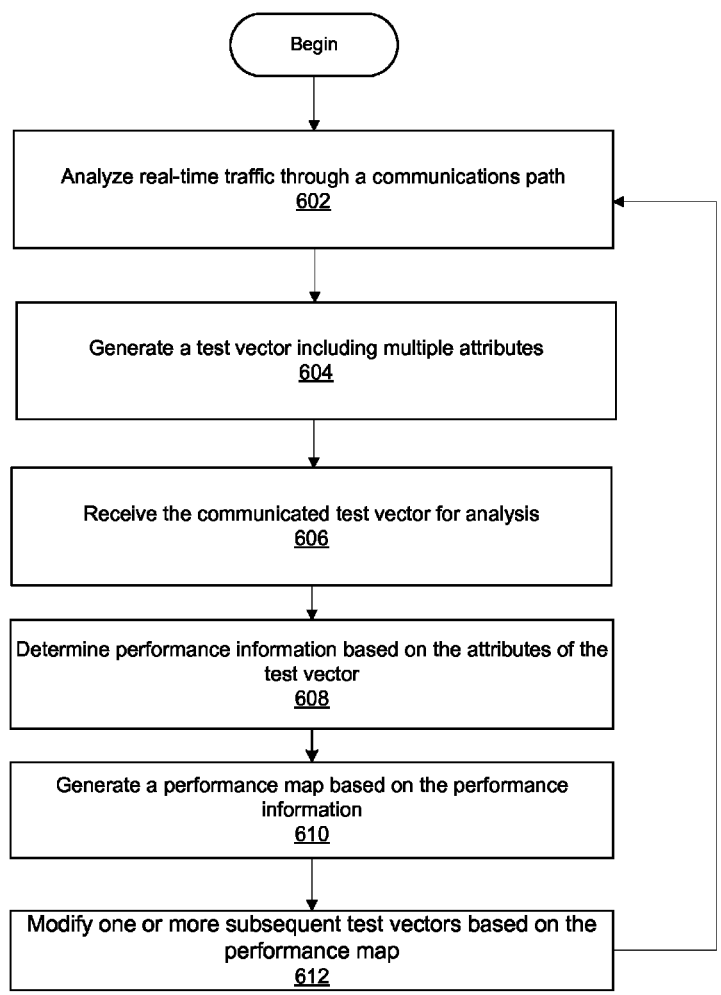
FIG. 6 is a flow chart of the test process in accordance with an illustrative embodiment.

FIG. 6 is a flow chart of the test process in accordance with an illustrative embodiment. The process of FIG. 6 may be implemented by a server, media gateway, pinhole firewall, or other device or software, hardware, and/or firmware module.

The process may begin by analyzing real-time traffic through a communications path (step 602). The communications path may be all or a portion of a communications path. For example, as previously described, an end-to-end communications path may be tested in segment for purposes of trouble shooting. Another example, a communication path may be a channelized facility like SONET fiber link where either the entire link is tested, or a sub-portion thereof.

Next, the test device generates a test vector including multiple attributes (step 604). Each attribute of the test vector may simulate a different portion of the real-time traffic utilizing different frame sizes, protocols, and other configurations to determine the performance of the communications path. The individual attributes of the test vector and cycles of test vectors may be separated based due to some performance criteria, such as on a regular time period, a number of frames communicated, or a frame rate.

The test device receives the communicated test vector for analysis (step 606). The original test device may receive the test vector in a two-way test or a secondary or end device may receive the test vector in a one-way test. As a result, the test results and performance map may be generated and/or analyzed locally or sent to a remote or central location for analysis and/or further distribution.

The test device determines performance information based on the attributes of the test vector (step 608). The device generates a performance map based on the performance information (step 610). Next, the test device modifies one or more subsequent test vectors based on the performance map (step 612). For example, attributes may be added or removed or adjusted based on new information or traffic characteristics. As a result, the performance map of FIG. 5 will also change. Optionally, the underlying systems may statically capture the performance map information prior to changes to provide records used in other management processes and/or trend analysis. The process may continue by returning to step 602 or step 604.

The illustrative embodiments may be utilized to determine line state performance for a communications path as it relates to the hierarchy of measurement functions. Primitive states are transformed into derived states involved with mid-level control plane protocols and control functions including the presentation of such information from the mid-layer to the upper layers of the Open Systems Interconnect model. For example, a primitive state may be that a circuit is capable of IP traffic (layer 3 primitive state) whereas, a derived state may recognize that the IP circuit is capable of supporting real-time voice traffic at a specific QoS.

The illustrative embodiments allow different attributes to run in a single test or in subsequent tests. For example, test vectors may utilize different patterns or may individually test for different line state conditions. Each test is separately converted to a performance map for analysis. For example, a test vector may include five identical attributes for tests to perform that are followed by five different attributes with a larger frame size that are separated by a much greater time period. Tests attributes may be sent serially or in parallel to one or more end devices. Attributes between test cycles of communicated test vectors may be sent in patterns, utilizing random logic, dynamically based on performance of the communications path, based on manual input or with recognition that specific test patterns are capable of generating specific physical line state conditions. Testing tokens may be utilized to ensure that the next test attribute is not implemented until the last attribute is received back for analysis. For example, testing tokens may be granted as each attribute finishes testing.

The previous detailed description is of a small number of embodiments for implementing the invention and is not intended to be limiting in scope. The following claims set forth a number of the embodiments of the invention disclosed with greater particularity.

What is claimed:

1. A method for testing line state comprising:
monitoring traffic through a communications path;
controlling generating of a test vector with a reflector predictor function, the reflector/predictor function having a first mode that has a vector control input fed by live traffic statistical values to resemble live packet flows monitored though the communications path and a second mode that includes a set of preset vectors that are triggered automatically to predict performance, wherein attributes of the test vector simulate configurations of the monitored traffic and include at least frame size;
initiating communication of the test vector to one or more end devices;
dynamically reconfiguring the attributes of the test vector during the communication of the test vector to simulate real-time changes in the monitored traffic in response to detecting the real-time changes in the monitored traffic;
measuring resulting test vector performance information for each of the attributes of the test vector; and
generating a dynamically updatable performance map utilizing the attributes of the test vector and the performance information, wherein the performance map is a multi-dimensional array of test results based at least in part on the attributes of the test vector and the performance information of the test vector, and wherein the performance map is queried by an application before initiating a process or communication, wherein the application selects a class of service marking for the process or communication in real time based on the performance information within the class of service reported hi the performance map.

2. The method of claim 1, wherein the test vector is utilized in a one-way or a two-way test, and wherein the test vector is dynamically reconfigured to include attributes of the monitored traffic that is determined to have errors.

3. The method of claim 1, wherein cycles of test vectors are communicated separated by a first time period, and wherein each of the attributes are separated by a second time period during the communication of the test vector.

4. The method of claim 3, wherein the second time period varies between the attributes of the test vector.

5. The method of claim 1, wherein each of the attributes are separated by a number of frames.

6. The method of claim 1, further comprising sending a plurality of test vectors, wherein attributes of each of the plurality of test vectors are different.

7. The method of claim 6, further comprising:
modifying one or more of the attributes of the plurality of test vectors in response to determining performance information for each of the one or more attributes is acceptable.

8. The method of claim 1, wherein the attributes further include at least quality of service levels, bursting rates, and protocol types.

9. The method of claim 1, further comprising:
dynamically reconfiguring the frame size of the test vector to duplicate frames sizes of the monitored traffic.

10. The method of claim 1, further comprising:
matching the frame size of the attributes utilizing remote network monitoring (RMON) for the monitored traffic.

11. The method of claim 1, wherein the performance map is generated to include a class of service, protocol type, port, quality of service marking, inter-frame gap, bits per second, and frame label types.

12. A network test device for testing a communications path, the network test device comprising:
a monitor interface configured to monitor traffic through a communications path, wherein the communications path includes a physical connection between the network test device and one or more end devices;
a test engine in communication with the monitor interface, the test engine is executed by a processor to generate a test vector, the test vector being controlled by a reflector/predictor function, the reflector/predictor function having a first mode that has a vector control input fed by live traffic statistical values to resemble live packet flows monitored though the communications path and a second mode that includes a set of preset vectors that are triggered automatically to predict performance, wherein attributes of the test vector simulate configurations of the monitored traffic measured by the monitor interface and include at least frame size, the test engine is further executed to initiate communication of the test vector to the one or more and devices, dynamically reconfigure the attributes of the test vector to simulate real-time changes in the monitored traffic during the communication of the test vector in response to detecting the real-time changes in the monitored traffic, measure resulting test vector performance information for each of the attributes of the test vector, and generate a dynamically updatable performance map utilizing the attributes of the test vector and the performance information, wherein the performance map is a multi-dimensional array of test results based at least in part on the attributes of the test vector and the performance information of the test vector, and wherein the performance map is queried by an application before initiating a process or communication, wherein the application selects a class of service marking for the process or communication in real time based on the performance information within the class of service reported in the performance map.

13. The network test device according to claim 12, further comprising:
alarm logic in communication with the test engine, the alarm logic being configured to send alarms to one or more recipients in response to determining the performance information exceeds one or more thresholds.

14. The network test device according to claim 12, wherein the test engine sends a loopback command to the one or more end devices for the test engine to determine additional performance information through a loop in addition to the performance map.

15. The network test device according to claim 12, wherein the application is in communication with the test engine, the application being configured to initiate the test vector across one or more communications paths in order to determine a communications path for communication, wherein the application configures the test vector based on types of communication utilized by the application and wherein the attributes further include at least quality of service levels, bursting rates, and protocol types.

16. A test device comprising:
a processor for executing a set of instructions; and
a memory for storing the set of instructions, wherein the set of instructions are executed by the processor to:
monitor traffic through a communications path,
control generation of a test vector with a reflector/predictor function, the reflector/predictor function having a first mode that has a vector control input fed by live traffic statistical values to resemble live packet flows monitored though the communications path and a second mode that includes a set of preset vectors that are triggered automatically to predict performance, wherein attributes of the test vector simulate configurations of the monitored traffic and include at least frame size,
initiating communication of the test vector to one or more end devices,
dynamically reconfigure the attributes of the test vector during the communication of the test vector to simulate real-time changes in the monitored traffic in response to detecting the real-time changes in the monitored traffic;
measure resulting test vector performance information for each of the attributes of the test vector, and
generate a dynamically updatable performance map utilizing the attributes of the test vector and the performance information, wherein the performance map is a multi-dimensional array of test results based at least in part on the attributes of the test vector and the performance information of the test vector, and wherein the performance map is queried by an application before initiating a process or communication, wherein the application selects a class of service marking for the process or communication in real time based on the performance information within the class of service reported in the performance map.

17. The test device according to claim 16, wherein the set of instructions are further executed to:
send alarms to one or more recipients in response to determining the performance information exceeds one or more thresholds.

18. The test device according to claim 16, wherein cycles of test vectors are communicated separated by a first time period, wherein the attributes are separated by a second time period during the communication of the test vector, and wherein the second time period varies between the attributes of the test vector.

19. The test device according to claim 16, wherein the set of instructions are further executed to:
send a plurality of test vectors, wherein the attributes of each of the plurality of test vectors are different, the attributes of the plurality of test vectors being modified in response to determining performance information for each of one or more attributes is acceptable.

20. The test device according to claim 16, wherein set of instructions are further executed to:
match frame sizes for the attributes utilizing remote network monitoring (RMON) in response to the monitored traffic, wherein the attributes further include at least quality of service levels, bursting rates, and protocol types.

* * * * *